Figure 1:
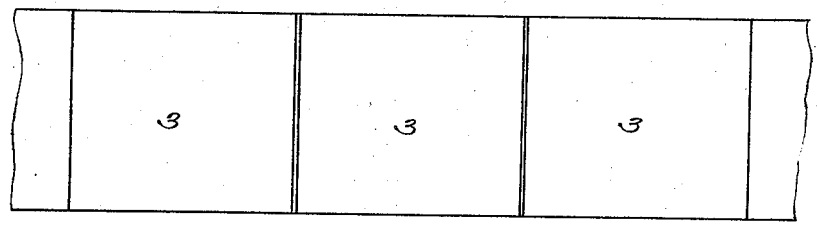

Dec. 21, 1937. H. STARK 2,103,122
LAMINATED SPRING
Filed June 27, 1935

Witness:    Inventor: Helmuth Stark

Patented Dec. 21, 1937

2,103,122

UNITED STATES PATENT OFFICE 2,103,122

LAMINATED SPRING

Helmuth Stark, Berlin-Charlottenburg, Germany, assignor to Hoesch-KölnNeuessen Aktiengesellschaft für Bergbau und Hüttenbetrieb, Dortmund, Germany, a German company Application June 27, 1935, Serial No. 28,709
In Germany June 29, 1934

4 Claims. (Cl. 267—47)

The present invention relates to a particular shaping of the ends of the plates or leaves of laminated springs. The ends of the leaves of such springs are usually tapered in their width and in their thickness.

With regard to the tapering in width, the outlines of this tapering show various forms, such as a straight spear-head with pointed end, or a gothic spear-head, or ending in a square, or in a trapezium, or in a semi-circle, or in a segment.

With regard to the outlines in thickness, the ends are either only square cut, or they are tapered by drawing or rolling. The tapering in thickness, by drawing or rolling the leaf ends, is of primary importance with regard to increasing the flexibility of the spring, and in order to obtain a uniformly stressed offset, the small cantilever representing the offset is given, in side elevation, the form of a convex parabola. These usual forms of leaf ends show disadvantages, their sharp edges tending, when the leaves are sliding over each other, to abrade the surface on the leaf above and to penetrate into that leaf, causing as a result of the small surface of contact, considerable surface pressure and thereby increasing the friction within the spring, and causing extreme wear on the spring and shortening its life.

My invention consists in tapering the leaf ends in thickness in the form of a concave curve, namely showing in the lower faces of the leaf ends a depression which commences at the base of the taper and follows, in side elevation, a curve which at the ends of tapers approaches the upper face of the leaf. This decrease of thickness of the leaf ends is therefore greater than linear.

The described concavely curved tapering of the thickness of the leaf ends may, in side elevation, have the form of a circular, or a parabolic, or of a substantially logarithmic curve.

When constructed in the preferred manner, the supposed reactive pressure at the leaf ends is not exerted at the ends, but acts at about the middle of the taper. As a result of the very considerable decreasing moment of inertia of the end portions, constructed according to the application, the flexibility is highly increased, and the extreme ends of the leaf press close against the adjacent leaf. The chief pressure thus operates at a protected point which is situated about midway between the base and the end of the taper. Although this construction does not prevent the gaping of the leaves to a certain extent, the difference compared with previous constructions lies in the fact that no gaping appears at the end edges of the leaves. The ends of each leaf are enabled to press over a considerable area close together to the adjacent leaf, as result of which the surface pressure as well as the wear is reduced. At the same time, the area of friction is protected against entering of dirt, which otherwise would increase the friction within the spring.

Figure 2:
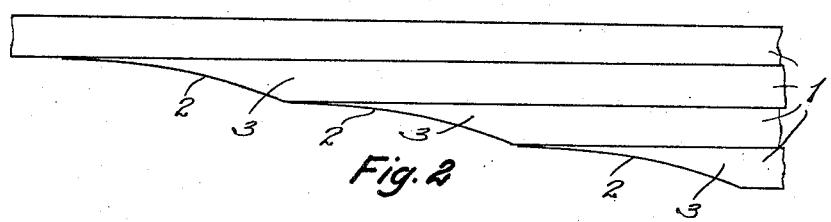
Figures 3, 4:
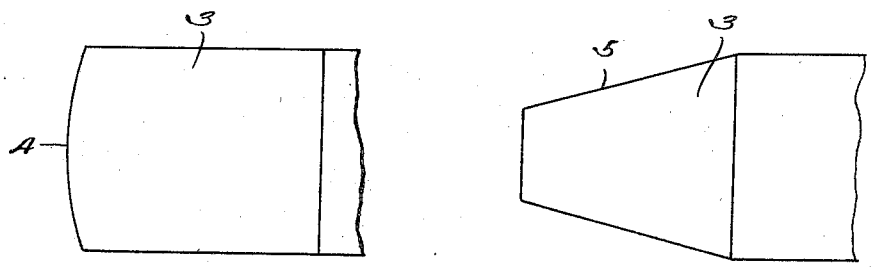
Figure 5:
Figure 6:
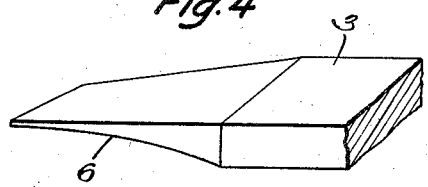
Figure 7:
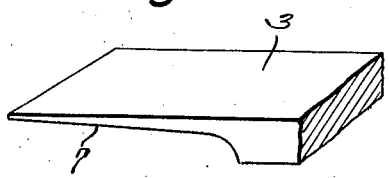
Figure 8:
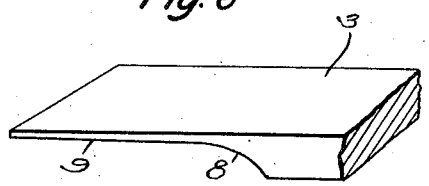

In the accompanying drawing, which forms a part of this description and which illustrates certain preferred embodiments of this invention, Figure 1 is a bottom plan view of a portion of a spring. Figure 2 shows the same spring in side elevation. Figures 3 and 4 are bottom plan views of tapered end portions illustrating two forms of tapering the leaf ends in width. Figures 5 and 6 show perspective views of the leaf ends shown in Figures 3 and 4, whilst Figures 7 and 8 show additional forms of tapering the leaf ends in thickness in perspective.

Figures 1 and 2 show, in base plan and in side elevation, a portion of a laminated spring comprising a plurality of spring leaves 1 with concave leaf ends 2, according to the present invention. The concave tapering in thickness of the ends 3 may either be given the form of a shallow circular curve 6, as shown in perspective in Figures 5 and 6, or of an approximate parabola 7, as shown in perspective in Figure 7, or of an approximate logarithmic curve 8 as shown in Figure 8. In the latter cases the thickness of the leaves decreases at first very rapidly, and then follows a practical linear tapering 9. The known outlines in the widths of the leaf ends 3 according to Figure 1 are shown as straight, but can also be somewhat rounded off as at 4, as shown in the base plan in Figure 3, or cut to trapezium form 5 as shown in the base plan in Figure 4, or in another form, such as a straight spear-head with round corners, or a gothic, or a roundnose, or a round spear-head.

While I have shown and described in detail certain particular examples of springs, these are to be understood merely as illustrative or preferred embodiments of the principle of my invention, and I do not desire to limit myself thereto but intend to cover every construction in which the principle of my invention is embodied.

Having thus described my invention, I claim:

1. A laminated spring, comprising a plurality of spring leaves, the leaf ends of which are tapered in thickness in a concave manner.

2. A laminated spring, comprising a plurality of spring leaves, the leaf ends of which are tapered in a concave circular curve.

3. A laminated spring, comprising a plurality of spring leaves, the leaf ends of which are tapered in thickness in a concave parabolic curve.

4. A laminated spring, comprising a plurality of spring leaves, the leaf ends of which are tapered in thickness in a concave logarithmic curve.

HELMUTH STARK.